United States Patent [19]
Tanaka

[11] Patent Number: 5,636,243
[45] Date of Patent: Jun. 3, 1997

[54] INTERTERMINAL DIRECT COMMUNICATION IN DIGITAL MOBILE COMMUNICATION SYSTEM

[75] Inventor: Syoichi Tanaka, Tokyo, Japan

[73] Assignee: NEC Corporation, Tokyo, Japan

[21] Appl. No.: 494,289

[22] Filed: Jun. 23, 1995

[30] Foreign Application Priority Data

Jun. 25, 1994 [JP] Japan .................................. 6-165955

[51] Int. Cl.⁶ .................................................. H04B 1/38
[52] U.S. Cl. ........................... 375/219; 375/356; 375/358; 370/311; 370/347; 370/350; 370/510; 370/915; 455/38.3; 455/51.1; 455/343
[58] Field of Search ........................... 455/51.1, 38.3, 455/343; 370/311, 350, 503, 507, 509, 510, 512, 522, 524, 915, 347; 375/219, 354, 356, 358

[56] References Cited

U.S. PATENT DOCUMENTS

| 5,428,638 | 6/1995 | Cioffi et al. | 375/224 |
| 5,570,369 | 10/1996 | Jokinen | 370/95.3 |

FOREIGN PATENT DOCUMENTS

| 2226934 | 7/1990 | United Kingdom . |
| 2279849 | 1/1995 | United Kingdom . |
| 2285723 | 7/1995 | United Kingdom . |

Primary Examiner—Stephen Chin
Assistant Examiner—Amanda T. Le
Attorney, Agent, or Firm—Whitham, Curtis, Whitham & McGinn

[57] ABSTRACT

In direct communications between PHS terminals, each terminal detects an intermittent timing signal from a predetermined control channel of the base station. Based on the intermittent timing signal, a terminal intermittently exchanges signaling information with another terminal through an idle channel to establish synchronization therebetween. A calling-party terminal searches for an idle channel and intermittently transmits a control signal to a called-party terminal through the idle channel with intermittently supplying power to a transmitter. A called-party terminal intermittently transmits a response signal to the calling-party terminal through the idle channel. When receiving the response signal from the called-party terminal, synchronization of the calling-party terminal with the called-party terminal is established.

10 Claims, 12 Drawing Sheets

FIG. 4

TIME SLOT FORMAT

BCCH
PCH | R | SS | PR | UW | CI | CSID | DATA (BCCH,PCH) | CRC |

DOWNGOING
SCCH | R | SS | PR | UW | CI | CSID | PSID | DATA(SCCH) | CRC |

R : RAMP TIME
SS : START SYMBOL
RR : PREAMBLE
UW : UNIQUE WORD FOR FRAME SYNC.
CI : CHANNEL INDICATOR
CRC : CYCLIC REDUNDANCY CHECK CODE

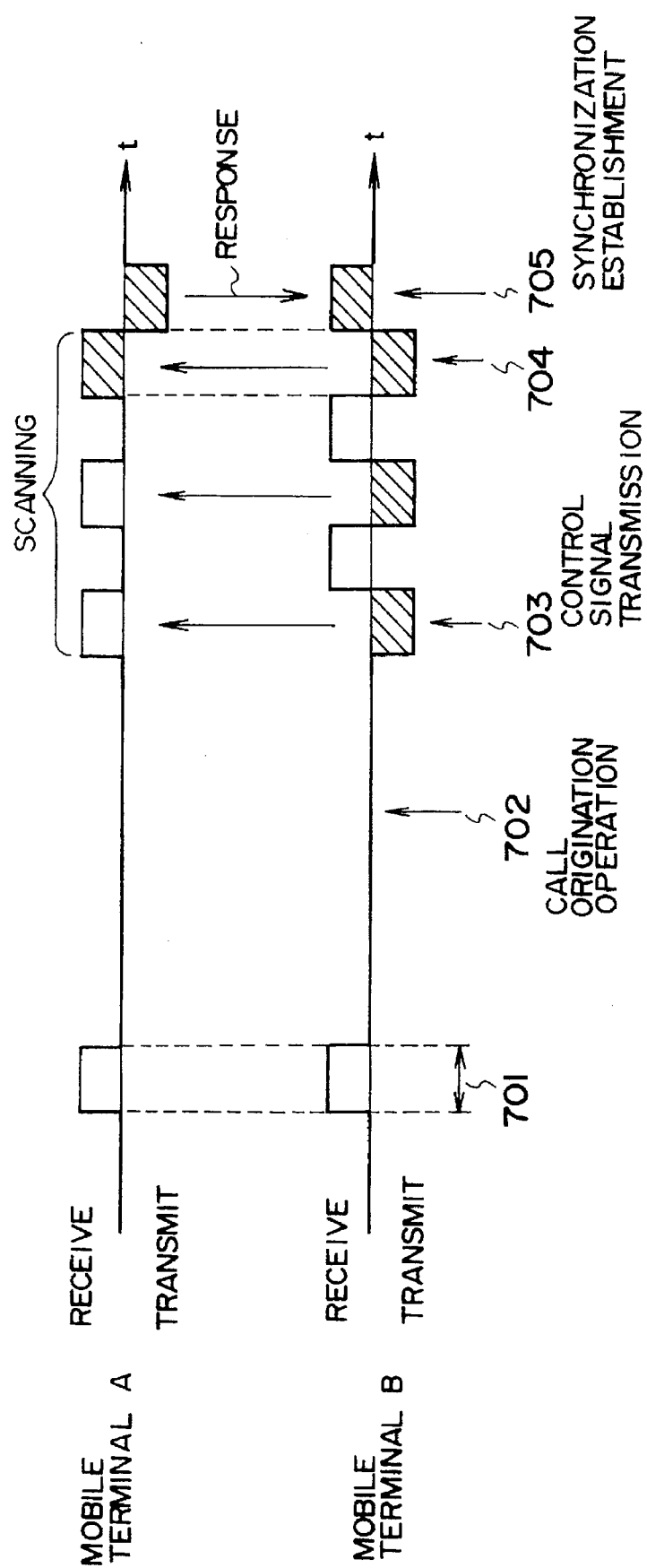

INTERTERMINAL DIRECT COMMUNICATION IN DIGITAL MOBILE COMMUNICATION SYSTEM

BACKGROUND OF THE INVENTION

1. Field of the Invention

The present invention relates to a digital mobile communication system, and more specifically to direct communication between mobile terminals without intervention of a base station.

2. Prior Art

Interterminal direct communication is one of most useful features of a digital cordless telephone which is called PHS (Personal Handy phone System). In the interterminal direct communication mode, it is required that connection control and communication between mobile terminals are performed on a certain time slot of a communication channel (RCR STD-28: Research & Development Center for Radio Systems Standards 28). Therefore, the mobile terminals need to repeat a scan of all the communication channels for detection of an unique word (or a synchronization word) to be synchronized with each other. Furthermore, a calling mobile terminal finds an idle channel, and then transmits a connection control signal continuously for a predetermined period of time, while waiting for a response signal through the same channel. After the calling party and the called party are synchronized, the well-known connection sequence proceeds.

However, in order to take synchronization with each other, the above-mentioned conventional PHS terminal repeats a scan of all the channels and, when it originates a call, the control signal is transmitted continuously. Since such an operation causes power consumption to increase, the battery incorporated in the terminal runs down in a short time.

SUMMARY OF THE INVENTION

It is an object of the present invention to provide a direct communication method which is capable of reducing power consumption of a mobile terminal.

It is another object of the present invention to provide a mobile terminal which establishes synchronization with another mobile terminal with lower power consumption.

In direct communications between terminals which are located within a service area of a base station in a digital mobile communication system, according to the present invention, each of the terminal detects an intermittent timing signal from a predetermined control channel of the base station. Based on a timing signal synchronizing with the intermittent timing signal, a terminal intermittently exchanges signaling information with another terminal through an idle channel to establish synchronization therebetween.

More specifically, a calling-party terminal first detects a idle channel from predetermined channels and then intermittently transmits a control signal to a called-party terminal through the detected channel in accordance with a timing signal synchronizing with the intermittent timing signal. On the other hand, the called-party terminal first detects the channel used by the calling-party terminal in accordance with the timing signal synchronizing with the intermittent timing signal. Second, the called party terminal intermittently receives the control signal from the calling-party terminal through the channel in accordance with the timing signal, and then intermittently transmits a response signal to the control signal to the calling-party terminal through the channel in accordance with the timing signal. In this way, synchronization between the terminals is established.

In each the terminal, power is intermittently supplied to a transmitter and a receiver in accordance with the timing signal. Since power is supplied at the time of transmitting or receiving, reduced power consumption and battery-saving is achieved in the course of handshaking.

BRIEF DESCRIPTION OF THE DRAWINGS

FIG. 4 is a diagram showing a time slot format of the logical control channel as shown in FIG. 3;

FIG. 13 is a timing chart showing a handshaking operation of two PHS terminals.

DETAILED DESCRIPTION OF THE PREFERRED EMBODIMENT

Figure 1:
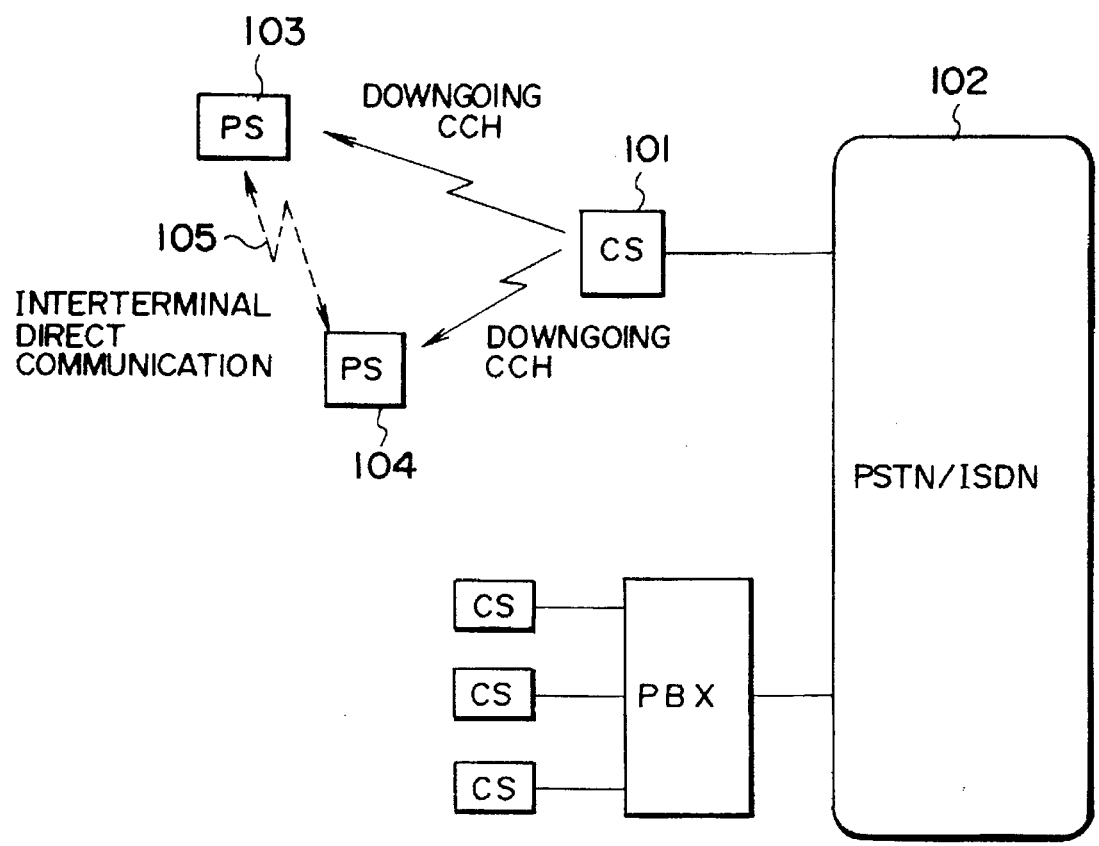
FIG. 1 is a schematic diagram showing a PHS communication system used in an embodiment of an interterminal communication method according to the present invention.

In a PHS communication system as illustrated in FIG. 1, let us assume that a base station 101 is connected to a network 102 and mobile terminals 103 and 104 are located in a service area of the base station 101. The base station 101 performs intermittent transmission of control signals through a downgoing control channel (downgoing CCH). Based on the timing of the downgoing CCH, a control signal and a response signal are intermittently transmitted between the mobile terminals 103 and 104 for handshake. After the synchronization is established between the mobile terminals 103 and 104, direct communication therebetween is performed through a certain time slot.

Figure 2:
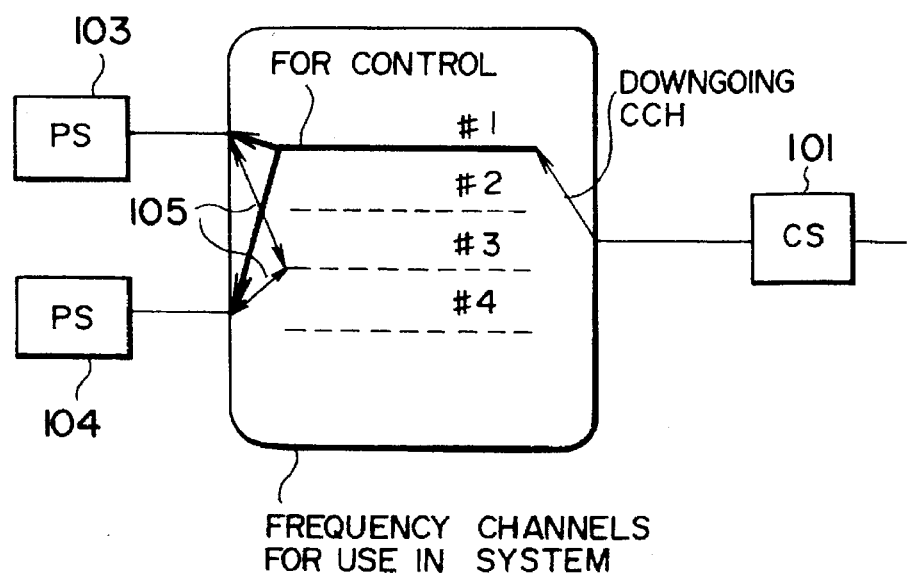
FIG. 2 is a schematic diagram showing a frequency channel arrangement for explanation of an operation of the embodiment.

As shown in FIG. 2, assuming that four frequency channels #1–#4 are assigned to this system and the frequency channel #1 is used for the downgoing CCH, the base station 101 transmits the control signals to the whole service area intermittently through the frequency channel #1. Synchronizing with the intermittent timing of the downgoing CCH, the mobile terminals 103 and 104 transmit control signals for handshake to each other through a certain time slot of a certain frequency channel, for example, the frequency channel #3.

Control Channel

Figure 3:
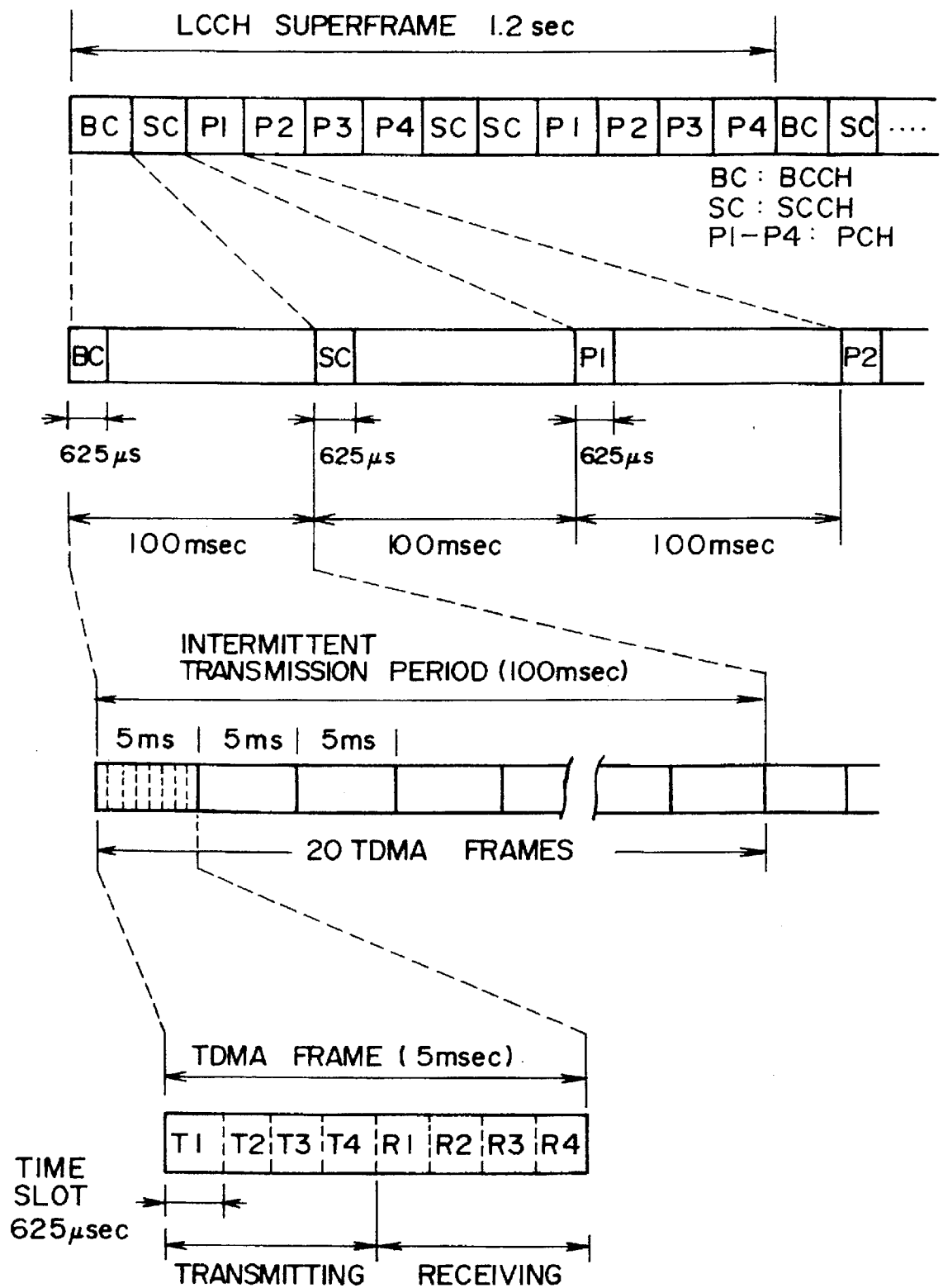
FIG. 3 is a diagram showing a superframe format of a logical control channel employed in the embodiment.

FIG. 3 shows a superframe format of a logical control channel (LCCH) employed in the embodiment. A LCCH superframe has a period of 1.2 sec and consists of 12 intermittent transmission slots each having a period of 100 msec. Each intermittent transmission slot consists of 20 TDMA frames each having a period of 5 msec. In this example, the first slot of a TDMA frame is assigned to LCCH. Therefore, the mobile terminals 103 and 104 receive control signals from the base station 101 at intervals of 100 msec. A time slot format is shown in FIG. 4. Respective functional channels are identified by the channel indicator (CI) in a time slot.

Figure 5:
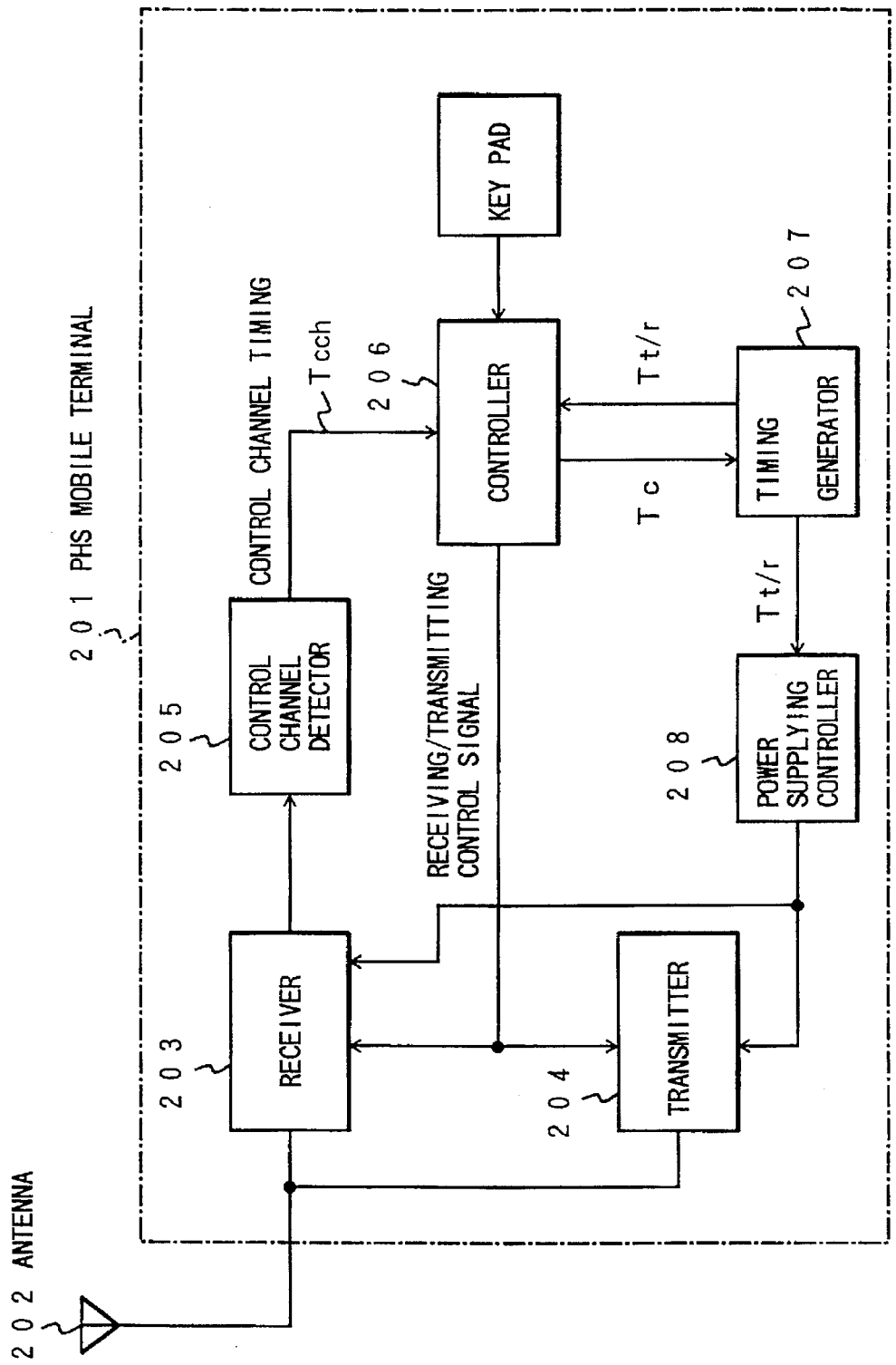
FIG. 5 is a block diagram illustrating a schematic circuit arrangement of a PHS terminal according to an embodiment of the present invention.

Mobile Terminal FIG. 5 shows a schematic circuit of a PHS mobile station according to an embodiment of the present invention. In a PHS mobile terminal 201, an antenna 202 is connected to a receiver 203 and a transmitter 204. The receiver 203 outputs a demodulated signal to a control channel detector 205 which detects the control channel CCH transmitted by the base station 101 and extracts the intermittent timing $T_{cch}$ (100 msec cycle) therefrom. The intermittent timing $T_{cch}$ is transferred to a controller 206 which generates a timing control signal Tc to output it to a timing generator 207. The controller 206 controls the entire operation of the mobile terminal including power supplying, receiving and transmitting operations. Synchronizing with the intermittent timing $T_{cch}$, the timing generator 207 generates an intermittent transmission/receive timing $T_{t/r}$ (5 msec cycle), and outputs it back to the controller 206. A power supplying controller 209 controls power supplying to the receiver 203 and the transmitter 204 in accordance with control of the controller 206 and the intermittent timing $T_{t/r}$. A more detailed circuit of the mobile terminal 201 will be described hereinafter.

Figure 6:
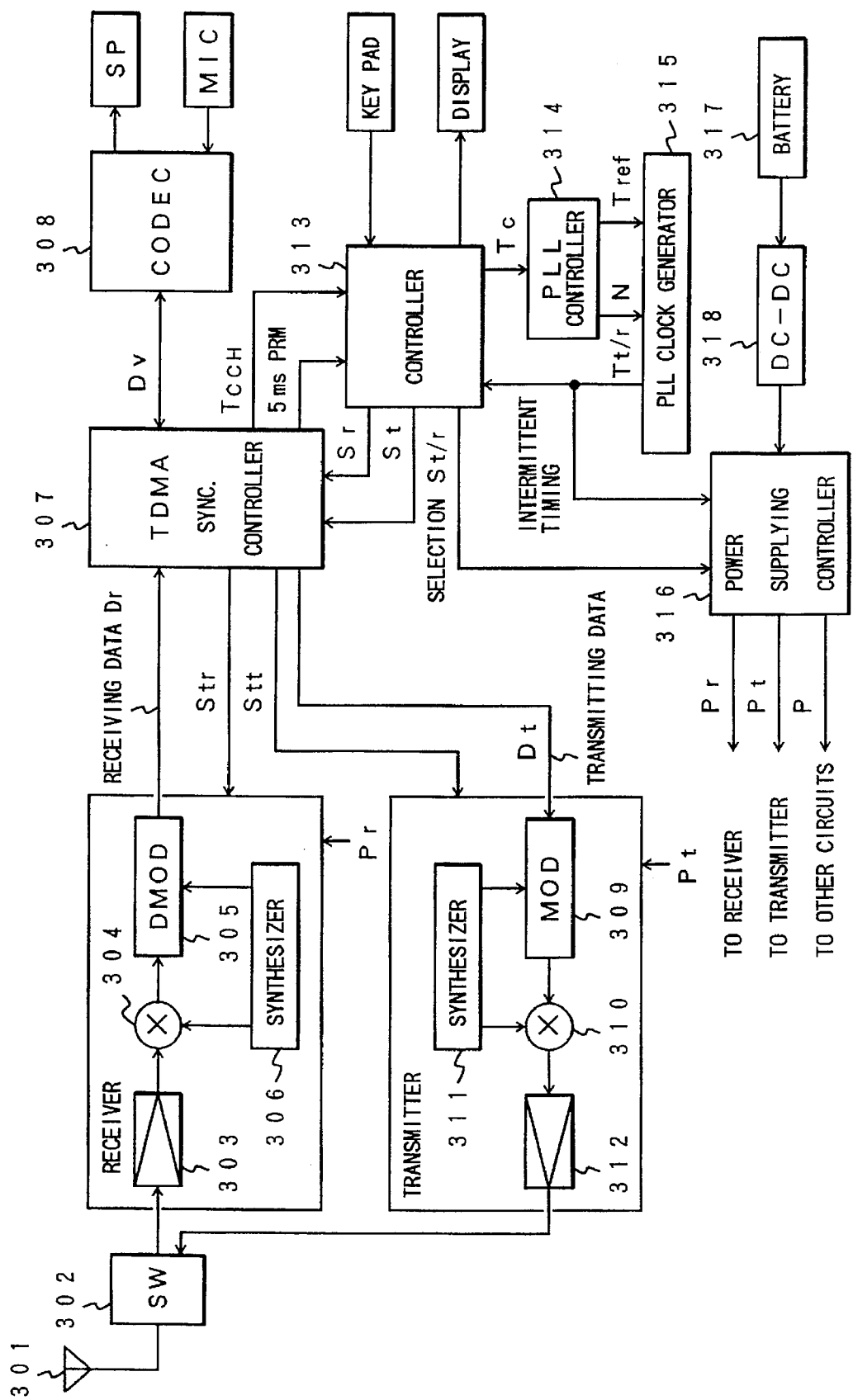
FIG. 6 is a block diagram illustrating a more detailed circuit arrangement of the PHS terminal as shown in FIG. 5.

As illustrated in FIG. 6, an antenna 301 is connected to the receiver and the transmitter through an antenna switch 302. The receiver is comprised of a low-noise amplifier 303, a mixer 304, a demodulator 305 and a frequency synthesizer 306. Receiving a high-frequency wave from the antenna 301, the receiver converts it to receiving data Dr which are demodulated by the demodulator 305. Local oscillation signals for down-converting and demodulating are supplied to the mixer 304 and the demodulator 305 by the frequency synthesizer 306. The receiving data Dr is input to a TDMA sync controller 307.

The TDMA sync controller 307 detects any functional channel, intermittent timing $T_{cch}$ of the control channel CCH, TDMA frame timing (5 ms FRM) and other necessary data to select voice data $D_v$ for this terminal from the receiving data $D_r$. Further, according to control signals $S_r$ and $S_t$ received from a controller 313, the TDMA sync controller 307 outputs a receive control signal $S_{tr}$ and a transmission control signal $S_{tt}$ to the receiver and the transmitter, respectively.

The voice data $D_v$ is decoded into an acoustic signal by the coder-decoder (CODEC) 308, and the acoustic signal is converted into sound waves by a speaker. A transmitting acoustic signal is output from a microphone to the CODEC 308 which encodes it into a transmitting voice data $D_v$. The TDMA sync controller 307 assembles TDMA time slot signals from the transmitting voice data, and outputs the transmitting data $D_t$ to the transmitter.

The transmitter is comprised of a modulator 309, a mixer 310, a frequency synthesizer 311, and a transmission power amplifier 312. Local oscillation signals for modulation and up-converting are supplied to the modulator 309 and the mixer 310 by the frequency synthesizer 311. The modulator 309 modulates the local oscillation signal for modulation according to the transmitting data $D_t$. The resultant modulated wave is up-converted by the mixer 310 mixing the modulated wave with the local oscillation signal for up-converting. Finally, the transmitting wave up-converted is amplified in power by the transmission power amplifier 312.

The controller 313 receives the intermittent timing $T_{cch}$ and the TDMA frame sync signal from the TDMA sync controller 307, and outputs a timing control signal Tc to the timing generator comprising a PLL(Phase-Locked Loop) controller 314 and a digital PLL clock generator 315. Receiving the timing control signal Tc from the controller 313, the PLL controller 314 outputs a reference timing signal $T_{ref}$ and a fixed coefficient N to the PLL clock generator 315. In a control channel receiving operation, the reference timing signal $T_{ref}$ synchronizes with the intermittent timing $T_{cch}$. The PLL clock generator 315 generates the intermittent transmission/receive timing $T_{ref}$ according to the reference timing signal $T_{ref}$ and the fixed coefficient N. In this embodiment, the intermittent timing $T_{cch}$ has a cycle of 100 msec and the intermittent transmission/receive timing $T_{t/r}$ has a cycle of 5 msec.

The intermittent timing $T_{t/r}$ is output to the controller 313 as well as a power supplying controller 316. The controller 313 generates the transmission control signal $S_t$, the receive control signal $S_r$ and a selection signal $S_{t/r}$ based on the intermittent timing $T_{t/r}$. The control signals $S_t$ and $S_r$ are output to the TDMA sync controller 307 and the selection signal $S_{t/r}$ is output to the power supplying controller 316.

A battery 317 supplies power to a DC-DC converter 318 which outputs adjusted power to the power supplying controller 316. The power supplying controller 316 supplies power to the receiver and/or the transmitter in accordance with the selection signal $S_{t/r}$ and the intermittent timing $T_{t/r}$.

Figure 7:
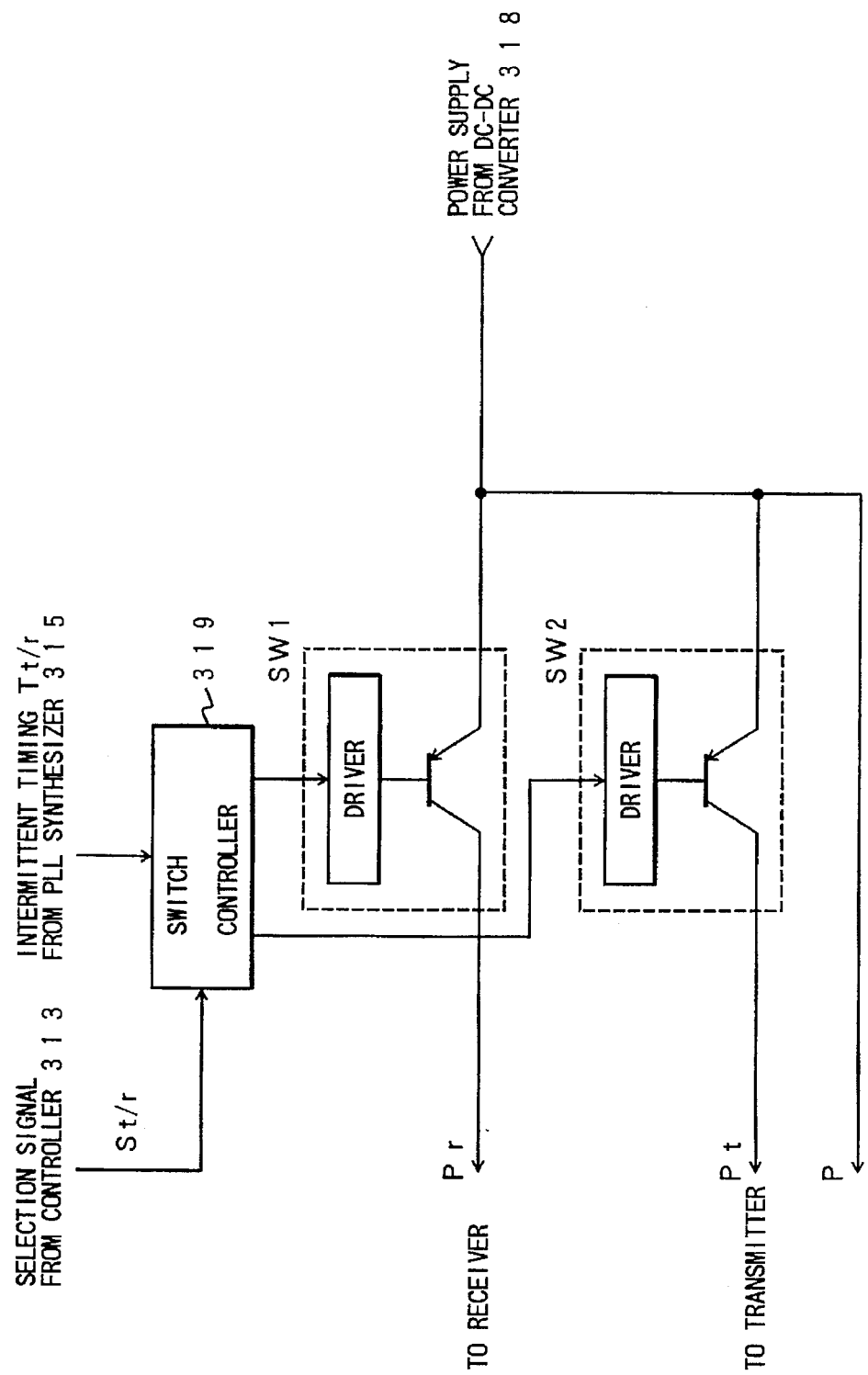
FIG. 7 is a circuit diagram of the power supplying controller of FIG. 6.

As shown in FIG. 7, the power supplying controller 316 is comprised of switching circuits SW1 and SW2 which are controlled by a switch controller 319 receiving the intermittent timing $T_{t/r}$ from the PLL clock generator 315. Power is transferred to the receiver through the switching circuit SW1 and to the transmitter through the switching circuit SW2. The switch controller 319 selects both or one of the switching circuits SW1 and SW2 according to the selection signal $S_{t/r}$. A switching circuit selected performs a switching operation on the power supply according to the intermittent timing $T_{t/r}$.

CCH Intermittent Receiving Operation

Figure 8:
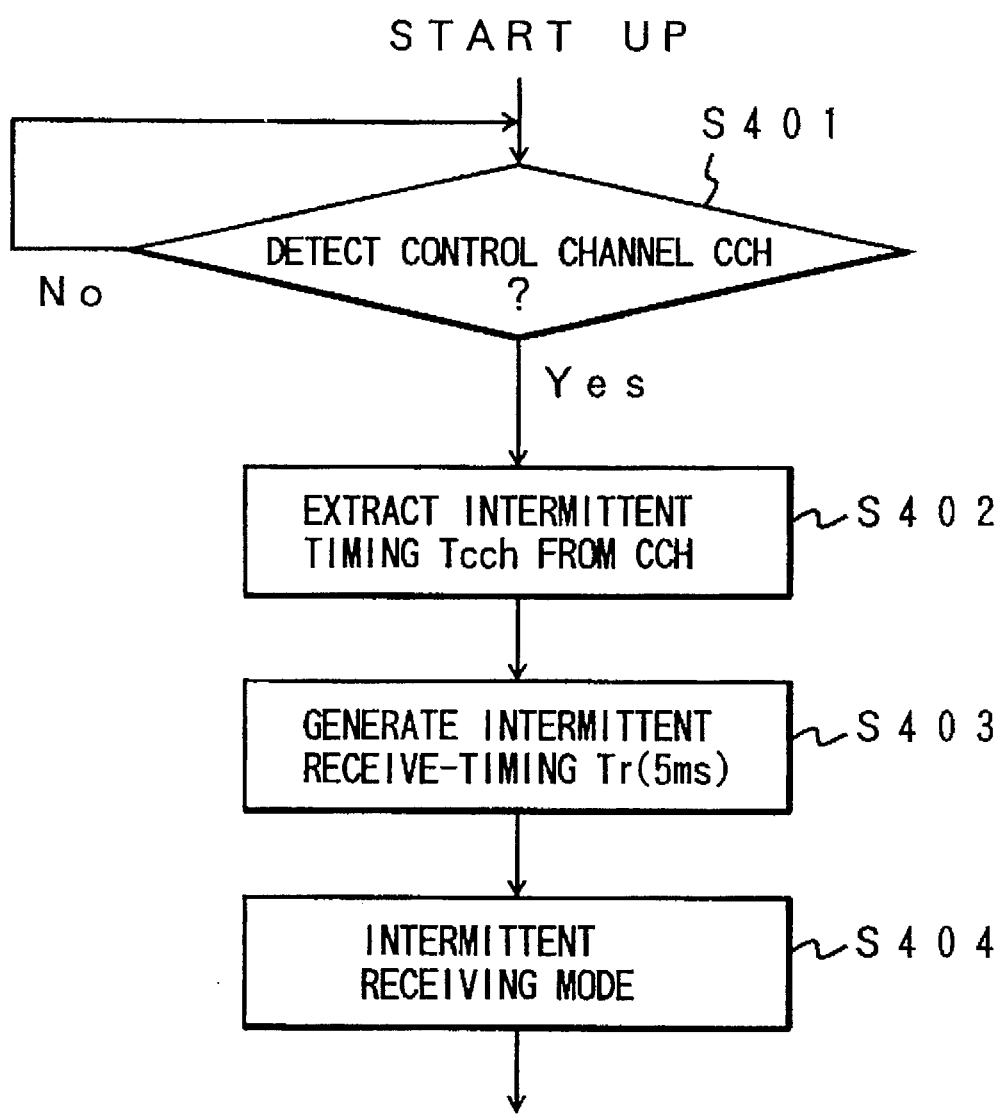
FIG. 8 is a flowchart showing a start-up operation of the PHS terminal.

Referring to FIG. 8, when starting a mobile terminal, the power supplying controller 316 supplies power to the receiver and other necessary circuits. The receiving data $D_r$ is transferred from the receiver to the TDMA sync controller 307. When the control channel CCH of the base station 101 is detected (Yes in S401), the TDMA sync controller 307 extracts the intermittent timing $T_{cch}$ from the control channel CCH and outputs it to the controller 313 (S402). The controller 313 outputs the timing control signal Tc to the PLL controller 314 which further outputs the fixed coefficient N and the reference timing $T_{ref}$ synchronizing with the intermittent timing $T_{cch}$ to the PLL clock generator 315. Receiving N and $T_{ref}$, the PLL clock generator 315 generates the intermittent receive-timing $T_r$ which has a cycle of 5 msec and is phase-locked to $T_{ref}$ (S403). The intermittent receive-timing $T_r$ is output to the controller 313 and the power supplying controller 316. According to the intermittent receive-timing $T_r$, the controller 313 outputs the control signal $S_r$ to the TDMA sync controller 307 which further outputs the receive-timing control signal $S_{rr}$ to the receiver. At the same time, the power supplying controller 316 supplies power Pr to the receiver with the power Pr switching on and off in accordance with the intermittent receive-timing $T_r$ (see FIG. 11). Therefore, the receiver performs the intermittent receiving operation according to the intermittent receive-timing $T_r$, which is referred to as an intermittent receiving mode (S404).

Operation of Calling-party Terminal

Figure 9:
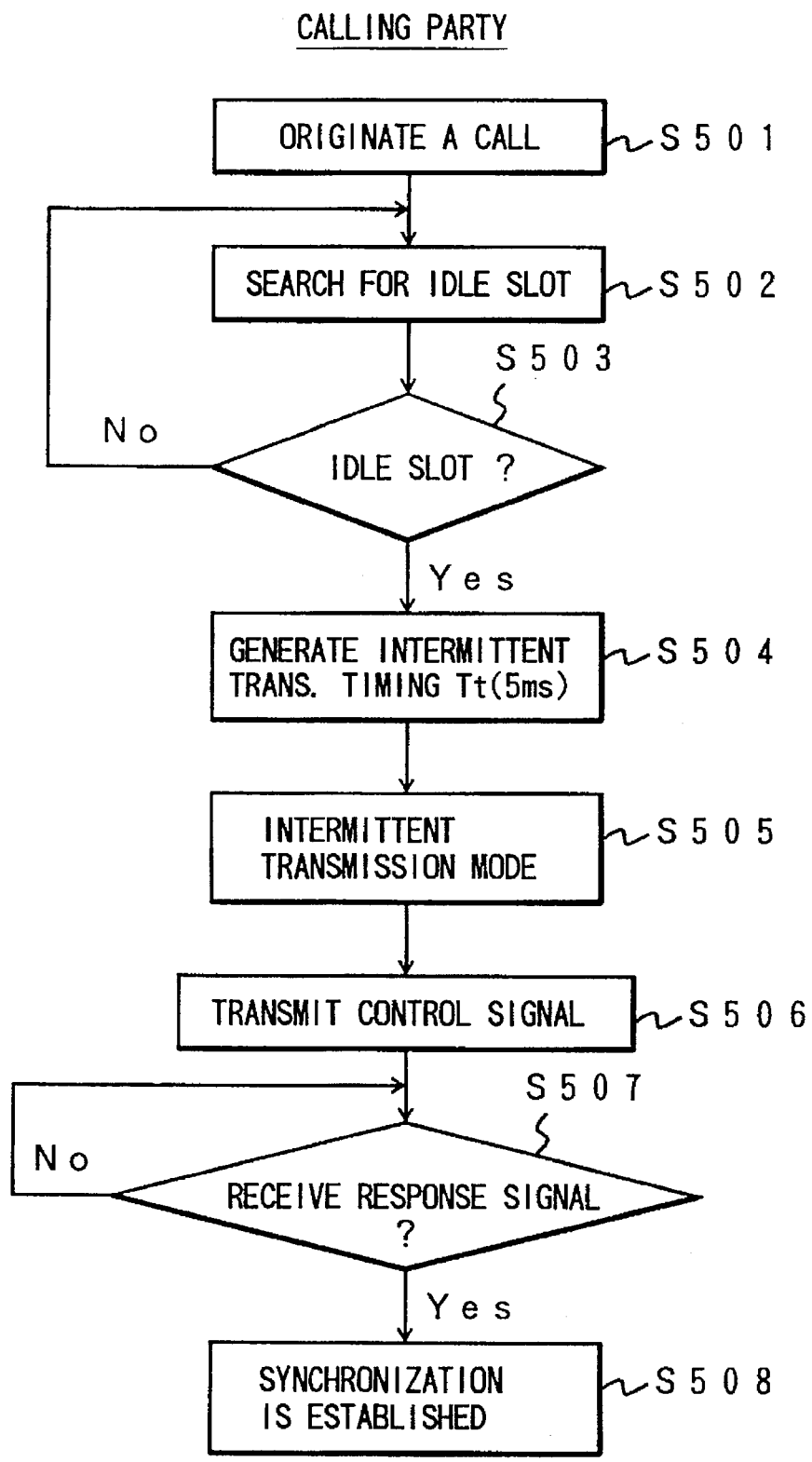
FIG. 9 is a flowchart showing an operation of a calling-party PHS terminal.

Referring to FIG. 9, the intermittent transmitting operation of a calling-party terminal is described hereinafter.

When a call is originated by a user operating the key pad of the mobile terminal (S501), the TDMA sync controller 307 searches for an idle time slot according to the intermittent receive-timing $T_r$ received from the PLL clock generator 315 (S502, S503). If an idle time slot, e.g. a transmitting time slot #T2, is found (Yes in S503), the controller 313 controls the PLL clock generator 315 such that an intermittent transmission-timing $T_t$ having a cycle of 5 msec is generated in accordance with the intermittent receive-timing $T_r$ (S504). According to the intermittent transmission-timing $T_t$, the controller 313 outputs the control signal $S_t$ to the TDMA sync controller 307 which further outputs the transmission-timing control signal $S_{tt}$ to the transmitter. At the same time, the power supplying controller 316 supplies power Pt to the transmitter with the power Pt switching on and off in accordance with the intermittent transmission-timing $T_t$ (see FIG. 12). Therefore, the transmitter performs the intermittent transmitting operation according to the intermittent transmission-timing $T_t$, which is referred to as an intermittent transmitting mode (S505).

The TDMA sync controller 307 assembles the TDMA data of the control signal in the idle time slot (e.g. #T2) and the transmitter transmits the data to a called party-terminal through the time slot (S506). When a response signal is received from the called-party terminal (Yes in S507), synchronization between the terminals is established (S508). After that, the well-known call setup sequence is followed to make communication with each other.

Since the transmission power amplifier 312 consumes a large amount of power, the longer the transmission power amplifier 312 works, the sooner the battery 317 runs down. However, according to the present invention, the power Pt is supplied to the transmitter only when the transmitting burst signal is transmitted through a time slot of 625 μsec having a cycle of 5 msec. Therefore, such an intermittent transmitting mode results in substantial battery-saving.

Operation of Called-party Terminal

Figure 10:
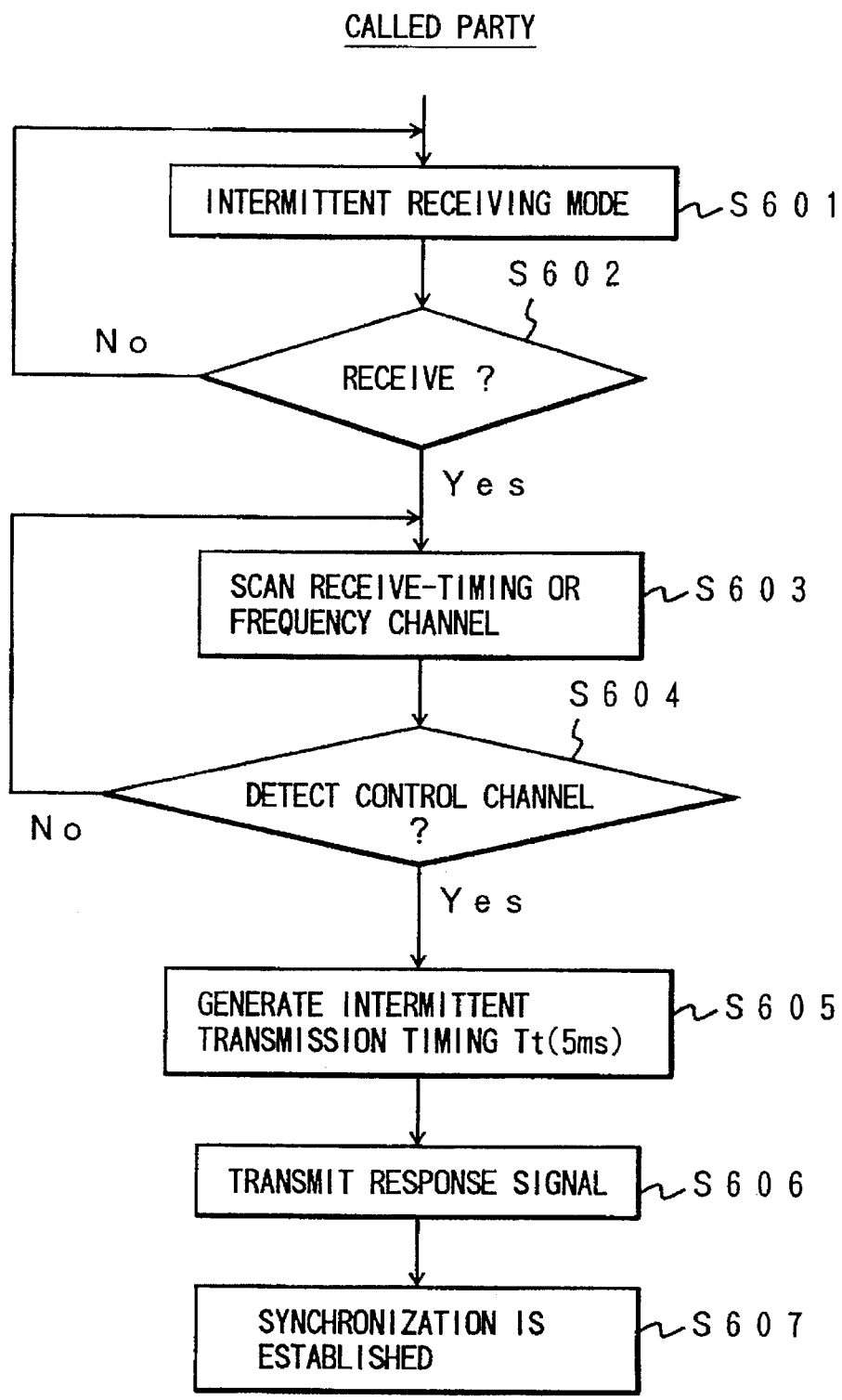
FIG. 10 is a flowchart showing an operation of a called-party terminal.

Referring to FIG. 10, when a mobile terminal is in the intermittent receiving mode (S601), assume that any radio signal is detected by changing in electromagnetic field (Yes of S602). The controller 313 searches for the control channel or the time slot used by the calling-party terminal. More specifically, the controller 313 causes the PLL clock generator 315 to change the intermittent receive-timing $T_r$ in time slots while changing the receiving control signal $S_r$. Following the receiving control signal $S_r$, the TDMA sync controller 307 controls the synthesizer 306 of the receiver so as to scan the frequency channels (S603). When the control channel or time slot is detected (Yes of S604), the controller 313 causes the PLL clock generator 315 to generate the intermittent transmission-timing $T_t$ synchronizing with the control channel detected (S605). According to the intermittent transmission-timing $T_t$, the power supplying controller 316 supplies power Pt to the transmitter and the TDMA sync controller 307 assembles a response signal to the control signal and transfers it as transmitting data Dt to the transmitter from which the response signal is transmitted to the calling-party terminal (S606). In this way, the synchronization between the terminals is established (S607).

Figure 11:
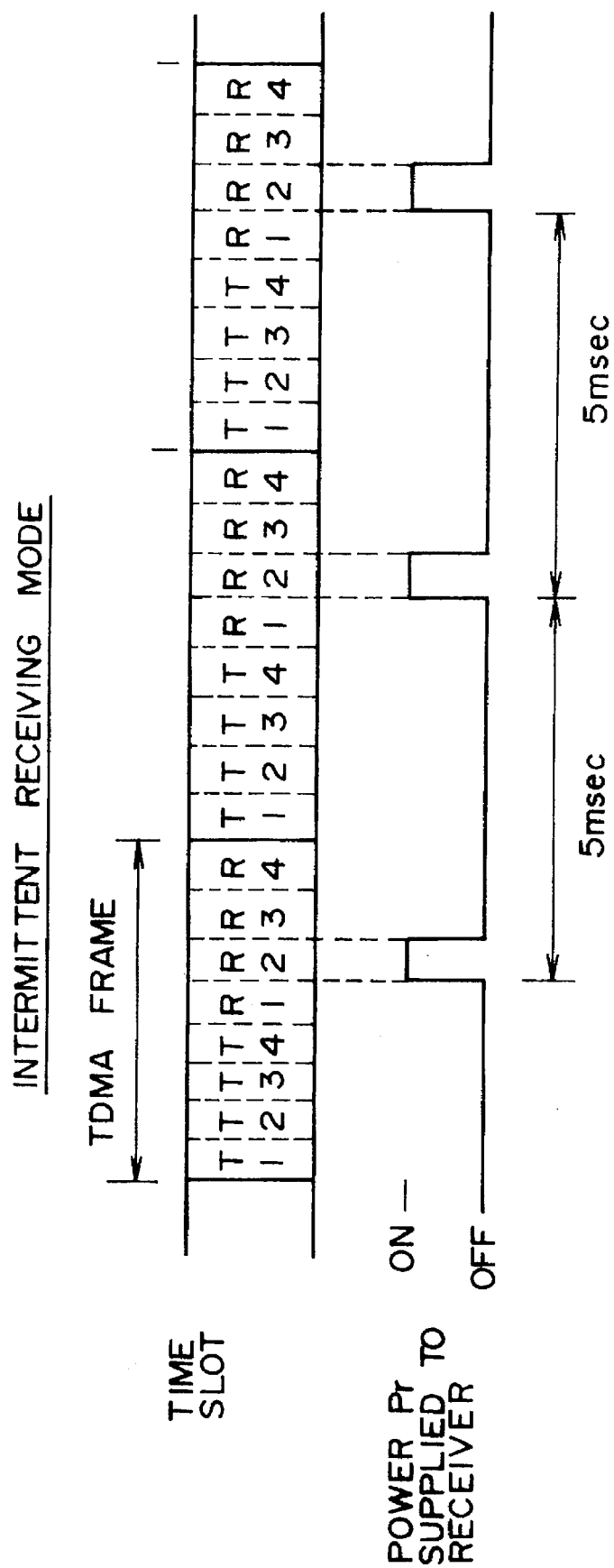
FIG. 11 is a timing chart showing an operation of the power supply controller in the intermittent receiving mode.
Figure 12:
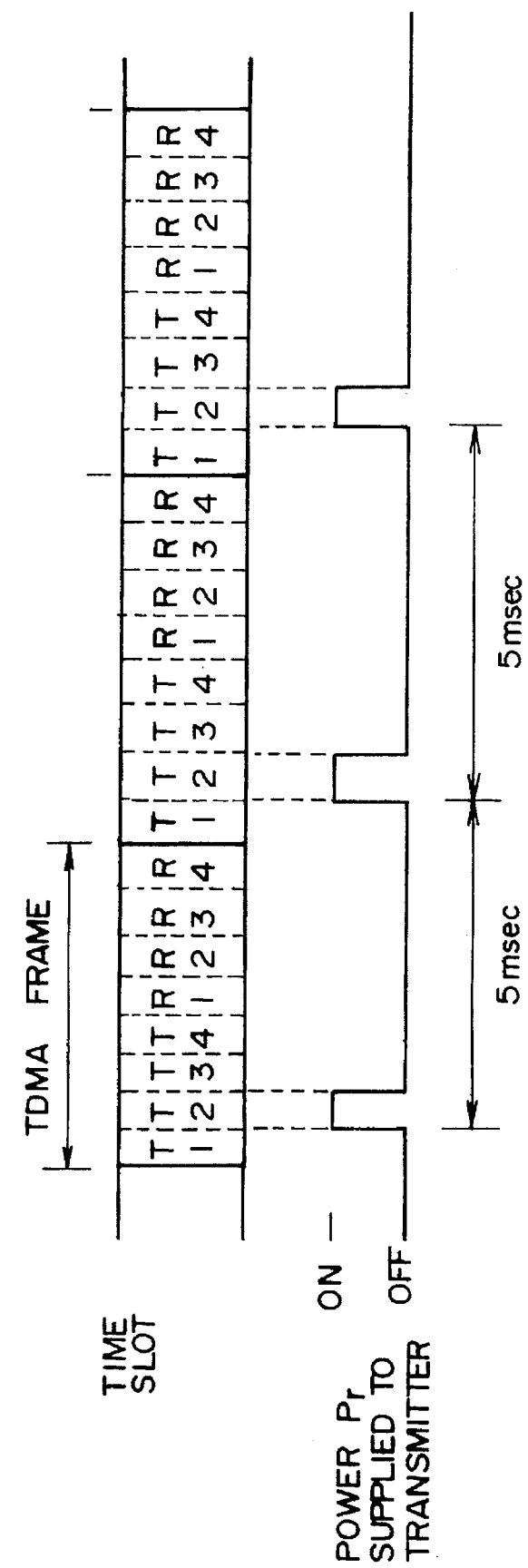
FIG. 12 is a timing chart showing an operation of the power supply controller in the intermittent transmitting mode.

FIGS. 11 and 12 show an intermittent receiving and transmitting modes in the case where the time slot #2 is used, respectively. The power supplying controller 316 supplies the power Pr to the receiver only at the timing of the time slot #R2 and the power Pt to the transmitter only at the timing of the time slot #T2.

Handshake sequence between terminals

FIG. 13 is a time chart which shows receiving and transmitting timing in communications between two mobile terminals A and B. At first, the terminals A and B are both performing the CCH intermittent receiving operation mentioned above in the timing (701) synchronizing with the control channel CCH of the nearest base station. In this situation, when a user of the terminal B makes a call origination (702), the terminal B searches for an idle slot and transmits a control signal to the terminal A through the channel of the idle slot (703).

On the other hand, when some receiving signal is detected, the terminal A, as mentioned above, scanning all the time slots to search for the channel used by the terminal B. When detecting the channel (704), the terminal A transmits a response signal to the terminal B through the channel. Synchronization between the terminals is established when the terminal B receives the response signal from the terminal A (705). After handshaking, usual communication is made between the terminals A and B.

As described above, a control signal and a response signal thereto are intermittently transmitted and received for handshaking based on the timing of the control channel CCH which a nearest base station is transmitting. In each mobile terminal, power is also supplied to the transmitter and the receiver intermittently, resulting in lower power consumption and the battery-saving.

What is claimed is:

1. A method for establishing synchronization between a plurality of terminals which are located within a service area of a base station in a digital mobile communication system having a predetermined number of channels, the method comprising the steps of:

detecting an intermittent timing signal from a predetermined control channel of the base station; and intermittently exchanging signaling information between the terminals through a channel based on a timing signal synchronizing with the intermittent timing signal.

2. The method according to claim 1, wherein a calling-party terminal performs the steps of:

detecting the intermittent timing signal from the predetermined control channel of the base station;

detecting a channel which is idle from the predetermined number of channels in accordance with the timing signal synchronizing with the intermittent timing signal; and intermittently transmitting a control signal to a called-party terminal through the channel in accordance with the timing signal.

3. The method according to claim 2, wherein the called-party terminal performs the steps of:

detecting the intermittent timing signal from the control channel of the base station;

detecting the channel used by the calling-party terminal in accordance with the timing signal synchronizing with the intermittent timing signal;

intermittently receiving the control signal from the calling-party terminal through the channel in accordance with the timing signal; and intermittently transmitting a response signal to the control signal to the calling-party terminal through the channel in accordance with the timing signal.

4. The method according to claim 1, further comprising a step of intermittently supplying power to a transmitter and a receiver of each the terminal in accordance with the timing signal.

5. The method according to claim 4, wherein a calling-party terminal performs a step of intermittently supplying power to the transmitter in accordance with the timing signal.

6. The method according to claim 4, wherein a called-party terminal performs a step of intermittently supplying power to the transmitter in accordance with the timing signal.

7. A mobile terminal which is capable of communicating with a second mobile terminal without intervention of a base station, the mobile terminal and the second mobile terminal being located within a service area of the base station in a digital mobile communication system having a predetermined number of channels, the mobile terminal comprising:

a receiver;

a transmitter;

a power supply;

detecting means for detecting an intermittent timing signal from a predetermined control channel of the base station;

generating means for generating a transmitting timing signal and a receiving timing signal in synchronization with the intermittent timing signal;

first control means for controlling the receiver and the transmitter such that the receiver intermittently receives signaling information from the second mobile terminal in accordance with the receiving timing signal and the transmitter intermittently transmit signaling information to the second terminal in accordance with the transmitting timing signal; and second control means for controlling the power supply such that power is intermittently supplied to the transmitter in accordance with the transmitting timing signal and is intermittently supplied to the receiver in accordance with the receiving timing signal.

8. The mobile terminal according to claim 7, wherein the second control means controls the power supply such that power is intermittently supplied to a transmission power amplifier of the transmitter in accordance with the transmitting timing signal.

9. A battery-saving method in a mobile terminal comprising a receiver, a transmitter and a battery, the mobile terminal being capable of communicating with a second mobile terminal without intervention of a base station, the mobile terminal and the second mobile terminal being located within a service area of the base station in a digital mobile communication system having a predetermined number of channels, the method comprising the steps of:

detecting an intermittent timing signal from a predetermined control channel of the base station;

generating a transmitting timing signal and a receiving timing signal in synchronization with the intermittent timing signal;

controlling the receiver and the transmitter such that the receiver intermittently receives signaling information from the second mobile terminal in accordance with the receiving timing signal and the transmitter intermittently transmit signaling information to the second terminal in accordance with the transmitting timing signal;

intermittently supplying power to the transmitter in accordance with the transmitting timing signal; and intermittently supplying power to the receiver in accordance with the receiving timing signal.

10. The method according to claim 9, wherein power is intermittently supplied to a transmission power amplifier of the transmitter in accordance with the transmitting timing signal.

* * * * *